(12) United States Patent
Jeon et al.

(10) Patent No.: US 12,103,595 B2
(45) Date of Patent: Oct. 1, 2024

(54) FRONT VEHICLE BODY STRUCTURE

(71) Applicants: Hyundai Motor Company, Seoul (KR); Kia Corporation, Seoul (KR)

(72) Inventors: Chan Woong Jeon, Incheon (KR); ChangHak Kang, Hwaseong-si (KR); Chulhee Heo, Hwaseong-si (KR); HaeHoon Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 204 days.

(21) Appl. No.: 17/880,834

(22) Filed: Aug. 4, 2022

(65) Prior Publication Data
US 2023/0211831 A1    Jul. 6, 2023

(30) Foreign Application Priority Data

Dec. 31, 2021 (KR) .................. 10-2021-0193819

(51) Int. Cl.
*B62D 25/14* (2006.01)
*B62D 25/08* (2006.01)

(52) U.S. Cl.
CPC ......... *B62D 25/145* (2013.01); *B62D 25/081* (2013.01)

(58) Field of Classification Search
CPC .. B62D 25/145; B62D 25/081; B62D 25/085; B62D 29/005; B62D 29/04

USPC ......... 296/70, 187.1, 187.09, 193.09, 203.02
See application file for complete search history.

(56) References Cited

U.S. PATENT DOCUMENTS

| | | | | |
|---|---|---|---|---|
| 4,964,672 A * | 10/1990 | Fujii | ................... | B62D 25/081 296/192 |
| 5,586,799 A * | 12/1996 | Kanemitsu | ........... | B62D 25/081 296/203.02 |
| 5,685,598 A * | 11/1997 | Inoue | ................... | B60H 1/0055 296/72 |
| 7,677,643 B2 * | 3/2010 | Nakamura | ............. | B62D 25/20 296/187.08 |
| 7,976,097 B2 * | 7/2011 | Watanabe | ................ | B60H 1/28 296/192 |
| 9,446,797 B2 * | 9/2016 | Nakauchi | ............. | B62D 25/088 |

* cited by examiner

*Primary Examiner* — Amy R Weisberg
*Assistant Examiner* — Veronica M Shull
(74) *Attorney, Agent, or Firm* — Slater Matsil, LLP

(57) ABSTRACT

An embodiment front vehicle body structure of a vehicle including an underbody and an upper body coupled to the underbody is provided. The front vehicle body structure includes a dash crossmember coupled to an upper part of a front surface of a dash panel provided in a front part of the upper body along a vehicle width direction, a front tray panel coupled to an upper part of the dash crossmember along a vehicle body length direction, and a front cowl member coupled to a front part of the front tray panel along the vehicle width direction.

20 Claims, 9 Drawing Sheets

FRONT VEHICLE BODY STRUCTURE

CROSS-REFERENCE TO RELATED APPLICATIONS

This application claims the benefit of Korean Patent Application No. 10-2021-0193819, filed on Dec. 31, 2021, which application is hereby incorporated herein by reference.

TECHNICAL FIELD

Embodiments of the present invention relate to a vehicle body of a vehicle.

BACKGROUND

Recently, a vehicle industry has introduced a new concept of future mobility visions for realizing a human-centered dynamic future city. One of these future mobility solutions is a PBV (purpose-built vehicle) as a purpose-based mobility.

An example of a PBV may be an environment-friendly mobile vehicle that provides various customized services to passengers during a period in which they travel to their destination on a ground. The PBV may also perform predetermined platooning of an optimal path for each situation by using electric vehicle (EV)-based artificial intelligence and unmanned autonomous driving. Furthermore, the PBV may also be used as a taxi (also called 'a robo-taxi') vehicle that moves to the destination of the occupant in an unmanned autonomous driving method.

For this purpose, the PBV is manufactured in a form of a box with a wide interior space. In addition, the PBV has a windshield glass and a cowl at the front of the vehicle body to provide the spacious interior space. Here, the vehicle body of the PBV composed of an underbody (also referred to as a rolling chassis or a skateboard in the industry) and an upper body assembled to the underbody.

For the vehicle body of such a PBV, it is most important to secure connection robustness of members forming the front part of the upper body. In addition, as the upper body is configured in the box shape, the vehicle body of the PBV has problems in that front skeletal hardness of the upper body is weak and impact absorption performance during a front collision is weak.

The above information disclosed in this background section is only for enhancement of understanding of the background of the invention, and therefore it may contain information that does not form the prior art that is already known to a person of ordinary skill in the art.

SUMMARY

Embodiments of the present invention relate to a vehicle body of a vehicle. Particular embodiments relate to a front vehicle body structure of a purpose-built vehicle (PBV).

Embodiments of the present invention provide a front vehicle body structure that may ensure the robustness of the member connection of the front part of the upper body and may improve the front collision performance.

A front vehicle body structure according to an embodiment of the present invention as a front vehicle body structure of a PBV including an underbody and an upper body coupled to the underbody includes a dash crossmember coupled to the upper part of the front surface of the dash panel provided in the front part of the upper body along the vehicle width direction, a front tray panel coupled to the upper part of the dash crossmember along the vehicle body back and forth direction, and a front cowl member coupled to the front part of the front tray panel along the vehicle width direction.

The front vehicle body structure according to an embodiment of the present invention may further include a front tray lower member coupled to the lower part of the front tray panel and connected to the dash crossmember and the front cowl member along the vehicle body back and forth direction.

In the front vehicle body structure according to an embodiment of the present invention, the dash crossmember and the front cowl member may be disposed parallel to each other along the vertical direction in the lower part of the front tray panel.

In the front vehicle body structure according to an embodiment of the present invention, the front cowl member may include a cowl rear member connected to the lower part of the front part of the front tray panel through the upper end and a cowl front member connected to the upper part of the front part of the front tray panel through the upper end and connected to the lower end of the cowl rear member through the lower end.

In the front vehicle body structure according to an embodiment of the present invention, the front cowl member may further include a cowl mounting bracket coupled to the lower part on both sides of the front tray panel along the vehicle width direction and connected to both ends of the cowl rear member.

In the front vehicle body structure according to an embodiment of the present invention, a first closed section may be formed between the cowl front member and the cowl rear member connected to each other.

In the front vehicle body structure according to an embodiment of the present invention, the dash crossmember may be provided with a '↑' cross-sectional shape in which an upper end is opened.

In the front vehicle body structure according to an embodiment of the present invention, a second closed section may be formed between the dash crossmember and the front tray panel.

In the front vehicle body structure according to an embodiment of the present invention, the front tray lower member may be provided with a '=' cross-sectional shape in which an upper end is opened.

In the front vehicle body structure according to an embodiment of the present invention, a third closed section may be formed between the front tray lower member and the front tray panel.

The front vehicle body structure according to an embodiment of the present invention may further include a cowl side support assembly coupled to both ends of each of the dash crossmember, the front tray panel, and the front cowl member along the vehicle width direction and connected to the front pillar of both sides of the upper body.

In the front vehicle body structure according to an embodiment of the present invention, each cowl side support assembly may include a cowl side support inner panel and a cowl side support outer panel connected to the cowl side support inner panel.

The front vehicle body structure according to an embodiment of the present invention may further include a cowl lower support assembly coupled to the front cowl member and coupled to the front part of the underbody.

In the front vehicle body structure according to an embodiment of the present invention, the cowl lower support assembly may include a body mounting inner member coupled to both ends along the vehicle width direction of the front cowl member along the vertical direction and a body mounting outer member coupled to the lower part of each cowl side support assembly along the vertical direction and coupled to each body mounting inner member.

In the front vehicle body structure according to an embodiment of the present invention, the cowl lower support assembly may further include a lower crossmember coupled to the lower end of each body mounting inner member and each body mounting outer member coupled to each other along the vehicle width direction.

In the front vehicle body structure according to an embodiment of the present invention, the cowl lower support assembly may be coupled to the front part of the underbody through a body mounting bracket.

Embodiments of the present invention may secure the rigidity and the strength along the vehicle body back and forth direction, the vehicle width direction, and the vertical direction of the front part of the upper body configured of the box type, and may improve the NVH and R&H performance and the front collision performance of the PBV.

In addition, effects obtained or predicted by embodiments of the present invention are disclosed directly or implicitly in a detailed description of embodiments of the present invention. That is, various effects predicted according to embodiments of the present invention will be disclosed in a detailed description to be described later.

BRIEF DESCRIPTION OF THE DRAWINGS

The drawings are provided for reference in describing embodiments of the present invention and the spirit of the present invention should not be construed only by the accompanying drawings.

Figure 1:
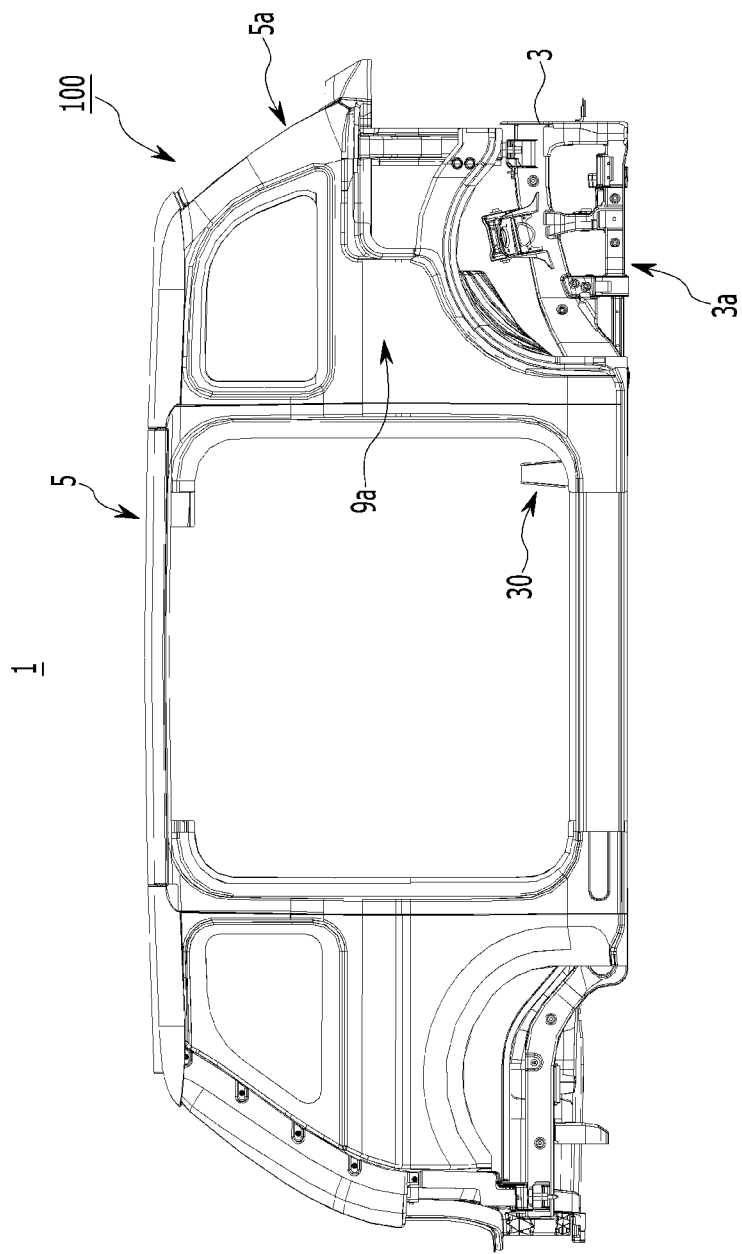
FIG. 1 is a view showing an example of a vehicle body of a PBV to which a front vehicle body structure according to an embodiment of the present invention is applied.

The following reference identifiers may be used in connection with the accompanying drawings to describe exemplary embodiments of the present disclosure.

| | |
|---|---|
| 1: vehicle body | 3: underbody |
| 3a: underbody front part | 5: upper body |
| 5a: upper body front part | 7: dash panel |
| 8: front windshield glass | 9: front pillar |
| 9a: front side outer panel | 10: front cowl assembly |
| 11: dash crossmember | 21: front tray panel |
| 29: second closed section | 31: front cowl member |
| 33: cowl rear member | 35: cowl front member |

-continued

| | |
|---|---|
| 37: cowl mounting bracket | 39: first closed section |
| 41: front tray lower member | 49: third closed section |
| 50: cowl side support assembly | 51: cowl side support inner panel |
| 53: cowl side support outer panel | 70: cowl lower support assembly |
| 71: body mounting inner member | 73: body mounting outer member |
| 75: lower crossmember | 77: body mounting bracket |
| 78: body mounting part | 79: mounting bolt |
| 100: front vehicle body structure | |

It should be understood that the above-referenced drawings are not necessarily to scale, presenting a somewhat simplified representation of various preferred features illustrative of the basic principles of the disclosure. The specific design features of embodiments of the present disclosure, including, for example, specific dimensions, orientations, locations, and shapes, will be determined in part by the particular intended application and use environment.

DETAILED DESCRIPTION OF ILLUSTRATIVE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the present disclosure. As used herein, singular forms are intended to include plural forms as well, unless the context clearly indicates otherwise.

As used herein, the term "comprises" and/or "comprising" refers to the presence of specified features, integers, steps, acts, elements, and/or components, but it should also be understood that it does not exclude a presence or an addition of one or more other features, integers, steps, acts, components, and/or groups thereof. As used herein, the term "and/or" includes any one or all combinations of one or more related items. The term "coupled" denotes a physical relationship between two components in which components are directly connected to each other or indirectly connected through one or more intermediary components, for example, by welding, self-piercing rivets (SPR), flow drill screws (FDS), structural adhesives, and the like.

The terms "vehicle", "of a vehicle", "automobile", or other similar terms used herein are generally used to cover various vehicles such as passenger vehicles including sports cars, sport utility vehicles (SUVs), buses, trucks, commercial vehicles, and the like, and cover hybrid vehicles, electric vehicles, hybrid electric vehicles, fuel cell electric vehicles, and other alternative fuel vehicles (i.e., vehicles driven by a fuel derived from resources other than petroleum).

Hereinafter, embodiments of the present invention will now be described in detail with reference to the accompanying drawings.

FIG. 1 is a view showing an example of a vehicle body of a PBV to which a front vehicle body structure according to an embodiment of the present invention is applied.

Referring to FIG. 1, the front vehicle body structure 100 according to an embodiment of the present invention may be applied to a vehicle body 1 of a purpose-built vehicle (hereinafter referred to as a 'PBV') in one example.

The PBV may be defined as an environment-friendly vehicle that is electric vehicle-based and provides a customized service for passengers while traveling to a destination.

In one example, the PBV may be a box-type design vehicle (e.g., a robo-taxi vehicle or a hailing vehicle) having a wide interior space to move to the destination of the passenger in an unmanned autonomous driving manner.

The vehicle body 1 of such a PBV includes a skateboard-type underbody 3 (those skilled in the art usually refer to it as 'a rolling chassis' or 'a chassis tray') and an upper body 5 assembled to the underbody 3.

The underbody 3 may be equipped with a battery assembly (not shown) and a drive motor. Also, the upper body 5 is a body in white (BIW) body coupled to the underbody 3 and may provide a cabin with a wide interior space.

In the present specification, for example, a reference direction for describing constituent elements may be set to be a vehicle body back and forth direction (e.g., a vehicle body length direction), a vehicle width direction, and a perpendicular direction.

"Upper end portion", "upper portion", "upper end", or "upper portion surface" of a component indicates an end portion, an upper portion, an upper end, or a surface of the component that is positioned relatively higher in the drawing, and "lower end portion", "lower portion", "lower end", or "lower portion surface" of a component indicates a lower end portion, a lower portion, a lower end, or a surface of the component that is positioned relatively lower in the drawing.

"End" (for example, one end, another end, or the like) of a component indicates an end of the component in any direction, and "end portion" (for example, one end portion, another end portion, or the like) of a component indicates a certain part of the component including the end.

The front vehicle body structure 100 according to an embodiment of the present invention includes a structure that may increase connection robustness of members forming a front part 5a of the upper body 5.

Figure 2:
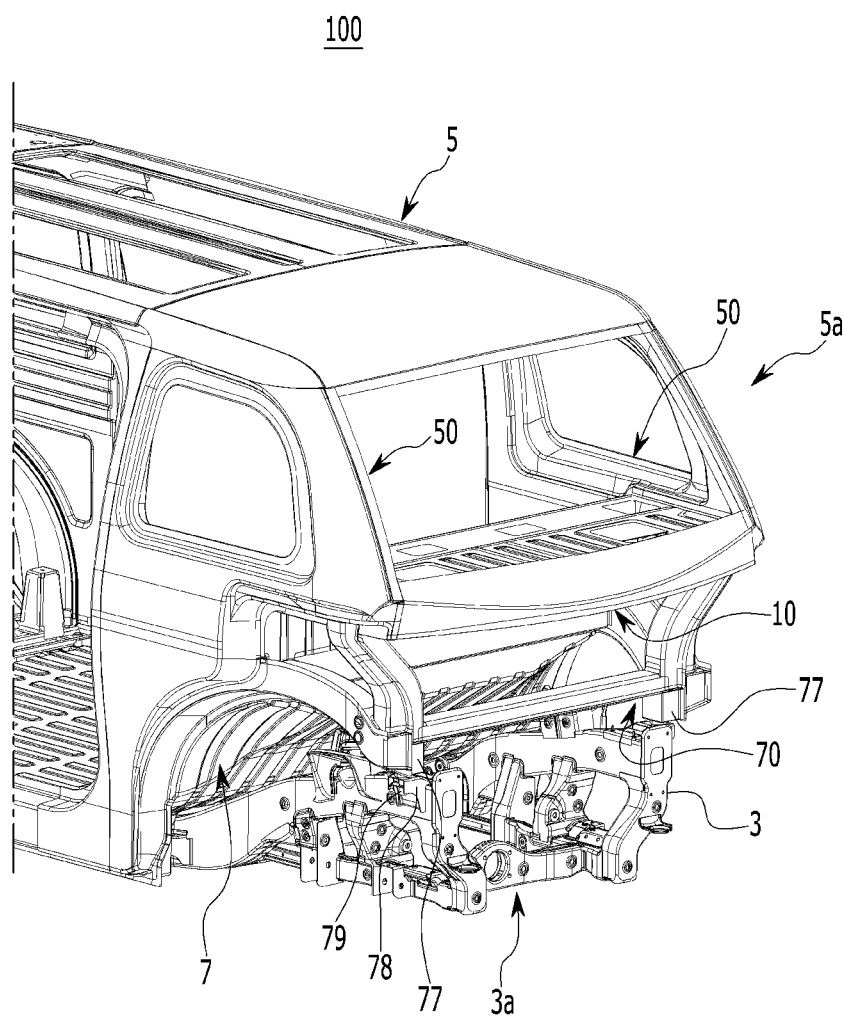
FIG. 2 to FIG. 4 are perspective views showing a front vehicle body structure according to an embodiment of the present invention.
Figure 3:
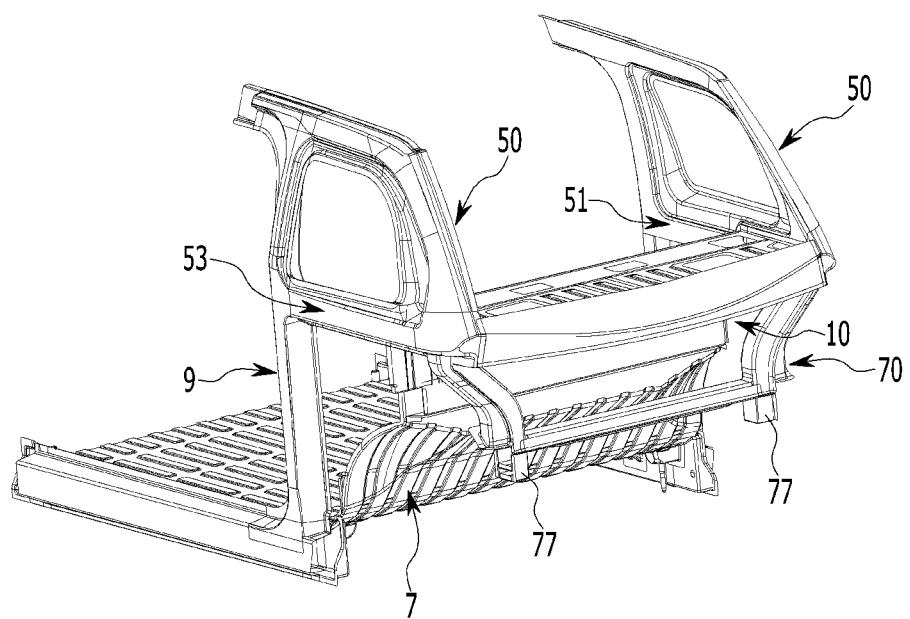
Figure 4:
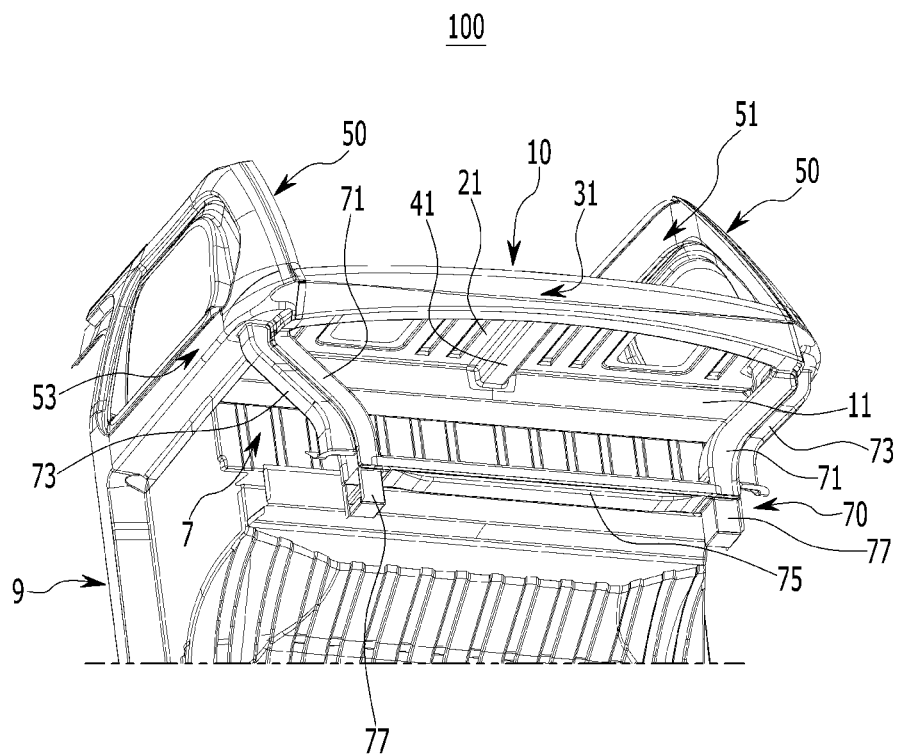
Figure 5:
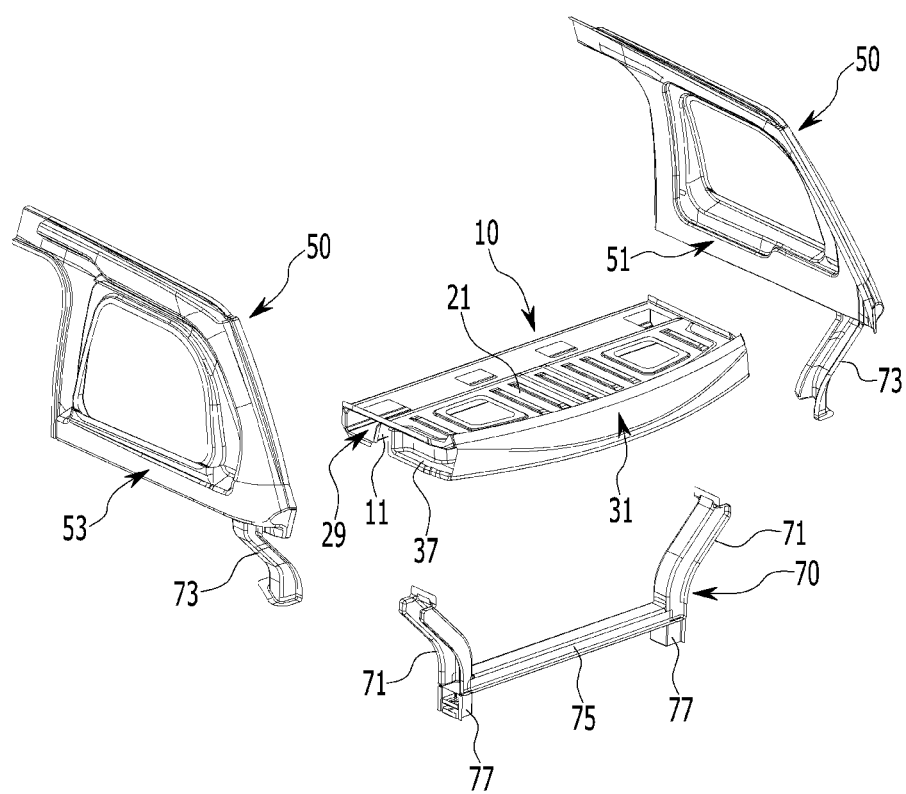
FIG. 5 is an exploded perspective view showing a front vehicle body structure according to an embodiment of the present invention.

FIG. 2 to FIG. 4 are perspective views showing a front vehicle body structure according to an embodiment of the present invention, and FIG. 5 is an exploded perspective view showing a front vehicle body structure according to an embodiment of the present invention.

Referring to FIG. 1 to FIG. 5, the front vehicle body structure 100 according to an embodiment of the present invention basically includes a front cowl assembly 10.

In an embodiment of the present invention, the front cowl assembly 10 is provided in the front part 5a of the upper body 5. Furthermore, the front cowl assembly 10 is connected to the dash panel 7 provided in the front part 5a of the upper body 5.

The front cowl assembly 10 is designed to separate the interior and the exterior of the front part of the PBV. In addition, the front cowl assembly 10 seals the interior and exterior of the front part of the PBV and blocks the inflow of external noise.

Figure 6:
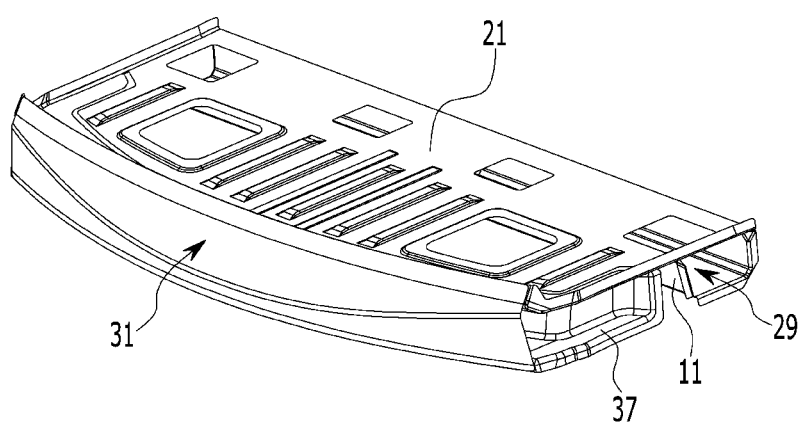
FIG. 6 is a perspective view showing a front cowl assembly applied to a front vehicle body structure according to an embodiment of the present invention.
Figure 7:
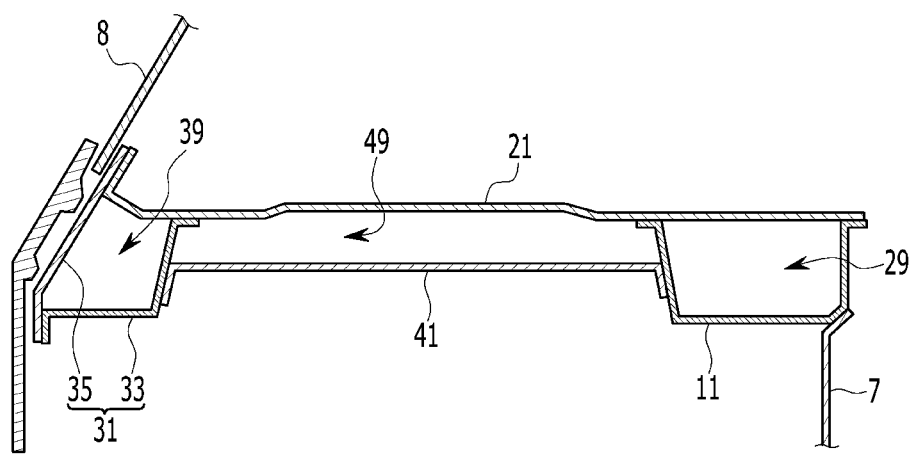
FIG. 7 is a cross-sectional view showing a front cowl assembly applied to a front vehicle body structure according to an embodiment of the present invention.
Figure 8:
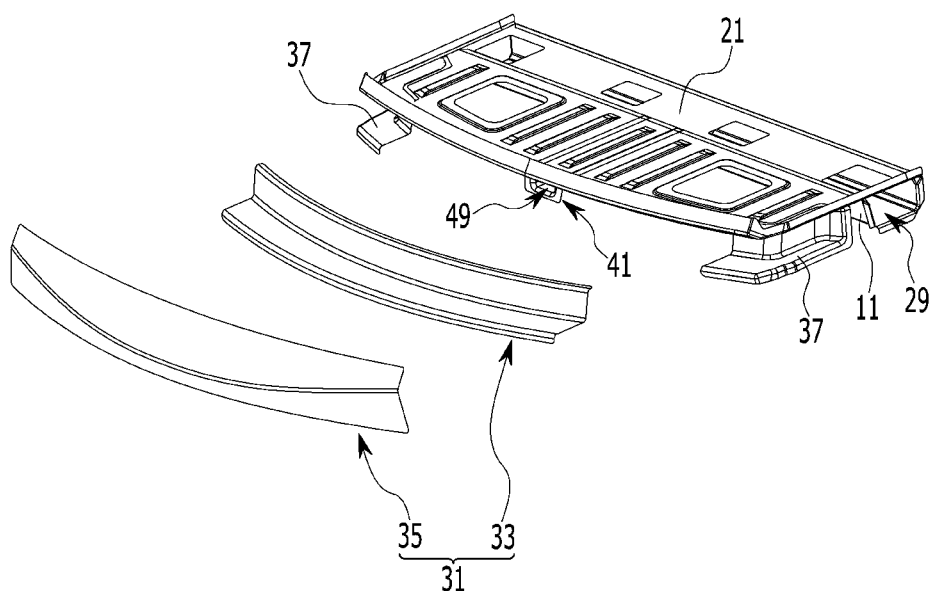
FIG. 8 and FIG. 9 are exploded perspective views showing a front cowl assembly applied to a front vehicle body structure according to an embodiment of the present invention.
Figure 9:
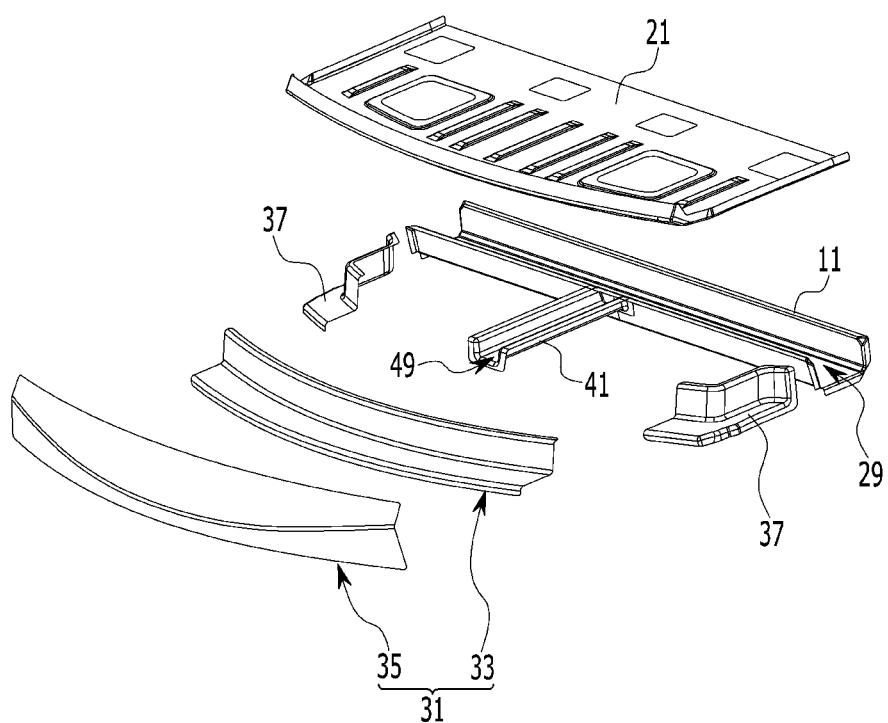

FIG. 6 is a perspective view showing a front cowl assembly applied to a front vehicle body structure according to an embodiment of the present invention, FIG. 7 is a cross-sectional view showing a front cowl assembly applied to a front vehicle body structure according to an embodiment of the present invention, and FIG. 8 and FIG. 9 are exploded perspective views showing a front cowl assembly applied to a front vehicle body structure according to an embodiment of the present invention.

Referring to FIG. 1 to FIG. 9, the front cowl assembly 10 according to an embodiment of the present invention includes a dash crossmember 11, a front tray panel 21, a front cowl member 31, and a front tray lower member 41.

In an embodiment of the present invention, the dash crossmember 11 is adapted to reinforce the rigidity and strength of the dash panel 7. The dash crossmember 11 is connected to the upper part of the front surface of the dash panel 7 along the vehicle width direction.

In one example, the dash crossmember 11 may have a 'U' cross-sectional shape in which the upper end is opened.

In an embodiment of the present invention, the front tray panel 21 is coupled to the upper portion of the dash crossmember 11 in the back and forth direction of the vehicle body.

Here, the upper part of the dash crossmember 11 may be connected to the lower part of the rear part of the front tray panel 21. In addition, a seat belt assembly (not shown) that is well known to those skilled in the art may be mounted to the dash crossmember 11 through the front tray panel 21.

In an embodiment of the present invention, the front cowl member 31 is disposed along the vehicle width direction in the frontmost part of the front part 5a of the upper body 5.

Here, the front cowl member 31 and the dash crossmember 11 may be disposed parallel to each other along the vertical direction in the lower part of the front tray panel 21. Furthermore, the front cowl member 31 may be coupled with a front windshield glass 8 that is well known to those skilled in the art.

This front cowl member 31 includes a cowl rear member 33, a cowl front member 35, and a cowl mounting bracket 37.

The cowl rear member 33 is connected to the lower part of the front part of the front tray panel 21 through the upper end part. In one example, the cowl rear member 33 may be provided in an 'L' cross-sectional shape in which one surface faces forward and the other surface extends forward from the lower end of the one surface.

The cowl front member 35 may be connected to the upper part of the front part of the front tray panel 21 through the upper end and to the lower end of the cowl rear member 33 through the lower end.

Here, the upper end and the lower end of the cowl rear member 33 and the upper end and the lower end of the cowl front member 35 may be connecting flanges that are well known to those skilled in the art.

A first closed section 39 may be formed along the vehicle width direction between the cowl rear member 33 and the cowl front member 35 connected to each other in this way. In one example, the first closed section 39 may be filled with an impact cushioning material that is well known to those skilled in the art (not shown).

The cowl mounting bracket 37 is adapted to mount the cowl rear member 33 to the lower part of the front tray panel 21. The cowl mounting bracket 37 is respectively coupled (e.g., bonded) to the lower part of the front tray panel 21 on both sides along the vehicle width direction. The respective cowl mounting bracket 37 may be connected (e.g., bonded) to both ends of the cowl rear member 33.

In an embodiment of the present invention, the front tray lower member 41 is adapted to reinforce the rigidity along the vehicle body back and forth direction of the front tray panel 21. The front tray lower member 41 is adapted to reinforce the rigidity according to the vehicle width direction of the dash crossmember 11 and the front cowl member 31.

The front tray lower member 41 is disposed along the vehicle body back and forth direction and is coupled to the lower part of the front tray panel 21. The front tray lower member 41 is connected to the dash crossmember 11 and the front cowl member 31 along the vehicle body back and forth direction.

In one example, the front tray lower member 41 may be provided in a 'U' cross-sectional shape with an opened upper end.

The tray lower member 41 may be connected to the cowl rear member 33 of the front cowl member 31 through the front end. Also, the rear end of the tray lower member 41 may be connected to the dash crossmember 11. Here, the front end and the rear end of the tray lower member 41 may be a connecting flange that is well known to those skilled in the art.

Meanwhile, as described above, a second closed section 29 may be formed along the vehicle width direction between the dash crossmember 11 and the front tray panel 21 connected to each other. Also, a third closed section 49 may be formed along the vehicle body back and forth direction between the tray lower member 41 and the front tray panel 21 connected to each other.

Referring to FIG. 1 to FIG. 5, the front vehicle body structure 100 according to an embodiment of the present invention further includes a cowl side support assembly 50 and a cowl lower support assembly 70.

In an embodiment of the present invention, the cowl side support assembly 50 is configured to support both sides along the vehicle width direction of the front cowl assembly 10 in the front part 5*a* of the upper body 5, respectively.

The cowl side support assembly 50 is coupled to both sides along the vehicle width direction of the front cowl assembly 10, respectively, and is connected to the front pillar 9 provided on both sides along the vehicle width direction of the upper body 5, respectively.

That is, each cowl side support assembly 50 is coupled to both ends of the dash crossmember 11, the front tray panel 21, and the front cowl member 31 in the vehicle width direction, respectively, and may be connected to each front pillar 9.

Each cowl side support assembly 50 includes a cowl side support inner panel 51 and a cowl side support outer panel 53.

The cowl side support inner panel 51 may be connected to both ends of each of the dash crossmember 11, the front tray panel 21, and the front cowl member 31 along the vehicle width direction, and may be connected to each front pillar 9.

The cowl side support outer panel 53 may be connected to the cowl side support inner panel 51 and may be connected to each front pillar 9. Here, the front side outer panel 9*a* as shown in FIG. 1 may be connected to the cowl side support outer panel 53.

In an embodiment of the present invention, the cowl lower support assembly 70 is configured to support the front cowl assembly 10 along the vertical direction and the vehicle width direction in the front part 5*a* of the upper body 5.

The cowl lower support assembly 70 may be coupled (e.g., connected) to the front cowl member 31 and each cowl side support assembly 50 of the front cowl assembly 10, and coupled (e.g., engaged) to the front part 3*a* of the underbody 3.

The cowl lower support assembly 70 includes body mounting inner members 71, body mounting outer members 73, and a lower crossmember 75.

The body mounting inner members 71 are respectively coupled to both ends of the front cowl member 31 along the vehicle width direction along the vertical direction. The upper end of each of the body mounting inner members 71 may be connected to each cowl mounting bracket 37 of the front cowl member 31. Here, the upper end of each of the body mounting inner members 71 may be a connecting flange that is well known to those skilled in the art.

The body mounting outer members 73 are coupled along the vertical direction to the lower part of each cowl side support assembly 50 and coupled to each body mounting inner member 71.

The upper end of each body mounting outer member 73 may be connected to the lower part of the cowl side support outer panel 53 of each cowl side support assembly 50. Here, the upper end of each body mounting outer member 73 may be a connecting flange that is well known to those skilled in the art.

Then, the lower crossmember 75 is coupled to the lower end of each body mounting inner member 71 and each body mounting outer member 73 coupled to each other along the vehicle width direction.

Both ends of the lower crossmember 75 may be connected to each body mounting inner member 71. Here, the lower end of each body mounting inner member 71 and each body mounting outer member 73, and both ends of the lower crossmember 75, may be connecting flanges that are well known to those skilled in the art.

Furthermore, the cowl lower support assembly 70 configured as described above, as shown in FIG. 2, may be coupled (e.g., engaged) to the front part 3*a* of the underbody 3 through the body mounting brackets 77.

The body mounting brackets 77 may be substantially coupled (e.g., bonded) to the lower end of each body mounting inner member 71 and each body mounting outer member 73, and both ends of the lower crossmember 75.

Each of the body mounting brackets 77 is engaged on both sides along the vehicle width direction of the front part 3*a* of the underbody 3. Here, each body mounting bracket 77, as shown in FIG. 2, may be engaged to the body mounting part 78 provided in the front part 3*a* of the underbody 3 through the mounting bolt 79.

According to the front vehicle body structure 100 according to an embodiment of the present invention as described so far, the front cowl assembly 10, the cowl side support assembly 50, and the cowl lower support assembly 70 configured in the front part 5*a* of the upper body 5 are included.

Therefore, the front vehicle body structure 100 according to an embodiment of the present invention may efficiently utilize the indoor space of the front part 5*a* of the upper body 5 configured as a box type. In addition, the front vehicle body structure 100 according to an embodiment of the present invention may ensure the connection robustness (e.g., the strength and the rigidity) according to the vehicle body back and forth direction, the vehicle width direction, and the vertical direction of the front part 5*a* of the upper body 5 having the box type.

Furthermore, the front vehicle body structure 100 according to an embodiment of the present invention may easily distribute the load applied to the front part 5*a* of the upper body 5 along the vehicle body back and forth direction, the vehicle width direction, and the vertical direction.

Accordingly, as the strength and the rigidity of the front part 5*a* of the upper body 5 increases, the front vehicle body structure 100 according to an embodiment of the present invention improves the NVH and R&H performance and the front collision performance of the PBV.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A front vehicle body structure of a vehicle, the vehicle comprising an underbody and an upper body coupled to the underbody, the front vehicle body structure comprising:
a dash crossmember coupled to an upper part of a front surface of a dash panel provided in a front part of the upper body along a vehicle width direction;
a front tray panel coupled to an upper part of the dash crossmember along a vehicle body length direction; and
a front cowl member coupled to a front part of the front tray panel along the vehicle width direction, wherein the dash crossmember and the front cowl member are disposed parallel to each other along a vertical direction in a lower part of the front tray panel.

2. The front vehicle body structure of claim 1, further comprising a front tray lower member coupled to a lower part of the front tray panel and coupled to the dash crossmember and the front cowl member along the vehicle body length direction.

3. The front vehicle body structure of claim 2, wherein:
the front tray lower member has a 'U' cross-sectional shape in which an upper end is opened; and
a closed section is defined between the front tray lower member and the front tray panel.

4. The front vehicle body structure of claim 1, wherein the front cowl member comprises:
a cowl rear member coupled to a lower part of the front part of the front tray panel through an upper end of the cowl rear member; and
a cowl front member coupled to an upper part of the front part of the front tray panel through an upper end of the cowl front member and coupled to a lower end of the cowl rear member through a lower end of the cowl front member.

5. The front vehicle body structure of claim 4, wherein the front cowl member further comprises cowl mounting brackets coupled to a lower part on both sides of the front tray panel along the vehicle width direction and coupled to both ends of the cowl rear member.

6. The front vehicle body structure of claim 4, wherein a closed section is defined between the cowl front member and the cowl rear member coupled to each other.

7. The front vehicle body structure of claim 1, wherein:
the dash crossmember has a 'U' cross-sectional shape in which an upper end is opened; and
a closed section is defined between the dash crossmember and the front tray panel.

8. A front vehicle body structure of a vehicle, the vehicle comprising an underbody and an upper body coupled to the underbody, the front vehicle body structure comprising:
a dash crossmember coupled to an upper part of a front surface of a dash panel provided in a front part of the upper body along a vehicle width direction;
a front tray panel coupled to an upper part of the dash crossmember along a vehicle body length direction;
a front cowl member coupled to a front part of the front tray panel along the vehicle width direction;
cowl side support assemblies respectively coupled to both ends of the dash crossmember, both ends of the front tray panel, and both ends of the front cowl member along the vehicle width direction and coupled to front pillars disposed at both sides of the upper body; and
a cowl lower support assembly coupled to the front cowl member and coupled to the front part of the underbody.

9. The front vehicle body structure of claim 8, wherein each of the cowl side support assemblies comprises:
a cowl side support inner panel; and
a cowl side support outer panel coupled to the cowl side support inner panel.

10. The front vehicle body structure of claim 8, wherein the cowl lower support assembly comprises:
a body mounting inner member coupled along the vehicle width direction to both ends of the front cowl member along a vertical direction; and
a body mounting outer member coupled to a lower part of the cowl side support assemblies along the vertical direction and coupled to each body mounting inner member.

11. The front vehicle body structure of claim 10, wherein the cowl lower support assembly further comprises a lower crossmember coupled to a lower end of each of the body mounting inner members and each of the body mounting outer members coupled to each other along the vehicle width direction.

12. The front vehicle body structure of claim 8, wherein the cowl lower support assembly is coupled to the front part of the underbody through body mounting brackets.

13. A vehicle body comprising:
an underbody;
an upper body coupled to the underbody;
a dash panel disposed in a vehicle width direction in a front part of the upper body;
a dash crossmember coupled to an upper part of a front surface of the dash panel;
a front tray panel coupled to an upper part of the dash crossmember along a vehicle body length direction;
a front cowl member coupled to a front part of the front tray panel along the vehicle width direction, wherein the front cowl member and the dash crossmember are disposed parallel to each other along a vertical direction in a lower part of the front tray panel; and
a front tray lower member coupled to a lower part of the front tray panel and coupled to the dash crossmember and the front cowl member along the vehicle body length direction.

14. The vehicle body of claim 13, wherein:
the front tray lower member has a 'U' cross-sectional shape in which an upper end is opened; and
a closed section is defined between the front tray lower member and the front tray panel.

15. The vehicle body of claim 13, wherein the front cowl member comprises:
a cowl rear member coupled to a lower part of the front part of the front tray panel through an upper end of the cowl rear member; and
a cowl front member coupled to an upper part of the front part of the front tray panel through an upper end of the cowl front member and coupled to a lower end of the cowl rear member through a lower end of the cowl front member.

16. The vehicle body of claim 15, wherein the front cowl member further comprises cowl mounting brackets coupled to a lower part on both sides of the front tray panel along the vehicle width direction and coupled to both ends of the cowl rear member.

17. The vehicle body of claim 15, wherein a closed section is defined between the cowl front member and the cowl rear member coupled to each other.

18. The vehicle body of claim 15, wherein:
the dash crossmember has a 'U' cross-sectional shape in which an upper end is opened;

a first closed section is defined between the cowl front member and the cowl rear member coupled to each other; and a second closed section is defined between the dash crossmember and the front tray panel.

19. The front vehicle body structure of claim 1, wherein the front cowl member comprises a cowl rear member coupled to a lower part of the front part of the front tray panel through an upper end of the cowl rear member.

20. The vehicle body of claim 13, wherein the front cowl member comprises a cowl rear member coupled to a lower part of the front part of the front tray panel through an upper end of the cowl rear member.

\* \* \* \* \*